June 23, 1964 J. W. BYRD 3,138,140
AUTOMATIC POULTRY WATERER
Filed Jan. 24, 1962 3 Sheets-Sheet 1

James W. Byrd
INVENTOR.

June 23, 1964

J. W. BYRD 3,138,140

AUTOMATIC POULTRY WATERER

Filed Jan. 24, 1962

James W. Byrd
INVENTOR.

June 23, 1964
J. W. BYRD
3,138,140
AUTOMATIC POULTRY WATERER
Filed Jan. 24, 1962
3 Sheets-Sheet 3
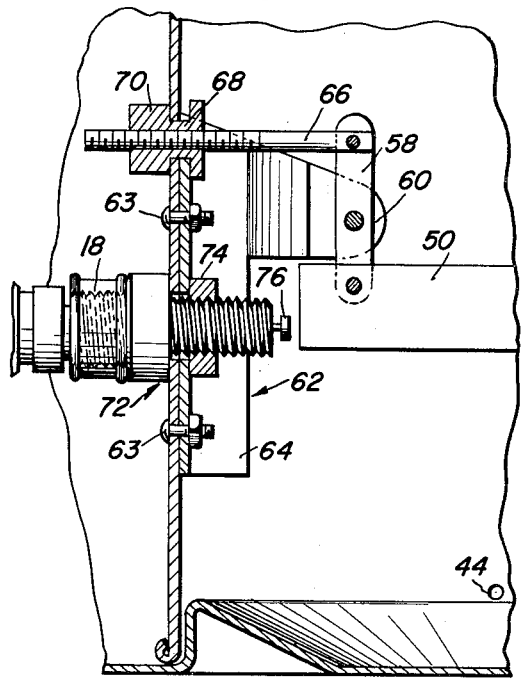
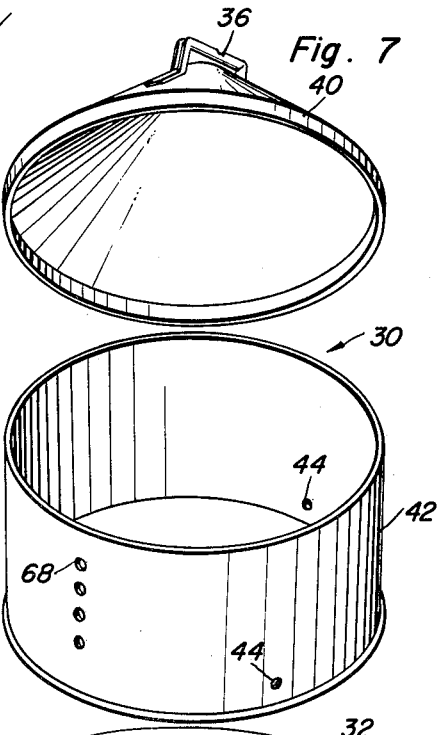
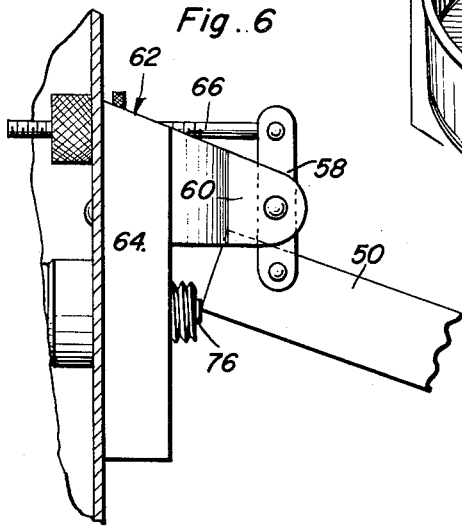
James W. Byrd
INVENTOR.

United States Patent Office 3,138,140
Patented June 23, 1964

3,138,140
AUTOMATIC POULTRY WATERER
James W. Byrd, Rte. 4, Box 2083, Huntsville, Ala.,
assignor of fifty percent to Eldred B. Medlock,
Albertville, Ala.
Filed Jan. 24, 1962, Ser. No. 168,327
3 Claims. (Cl. 119—80)

The present invention relates generally to the supplying of water to poultry or animals, and more particularly to the automatic provision of fresh water to baby chicks especially during the brooder stage.

One of the primary objects of the present invention is to automatically supply a plurality of individual poultry waterers with fresh water.

Another object is to provide a system wherein the water level is automatically maintained at any of a plurality of preset levels.

A further object is to provide a poultry waterer wherein the water level can be adjusted from outside the waterer without the necessity of disturbing the operation of said waterer.

Also, an important object of the present invention is the provision of a system wherein a plurality of individual waterers can be arranged in a variety of positions so as to be readily adaptable to various external conditions.

An additional object is the provision of a system which eliminates time consuming hand filling of the individual poultry waterers.

Likewise, an object of the present invention is to provide a compact unit easily assembled for convenient transportation in its assembled form.

A further important feature of the present invention is the provision of an automatic supply system which is simple in construction, easy to use, long lasting and generally inexpensive to manufacture.

These together with other objects and advantages which will become subsequently apparent reside in the details of construction and operation as more fully hereinafter described forming a part hereof, wherein like numerals refer to like parts throughout, and in which:

FIGURE 5 is a sectional view taken substantially upon a plane passing along 5—5 of FIGURE 4 and illustrating the manner of securing the valve and float means to said waterer;

FIGURE 6 is an enlarged sectional detail view of the float arm in a lowered position contacting and actuating the valve means; and FIGURE 7 is an exploded perspective of the various components comprising the individual poultry waterers with the valve and float means not being shown.

Figure 1:
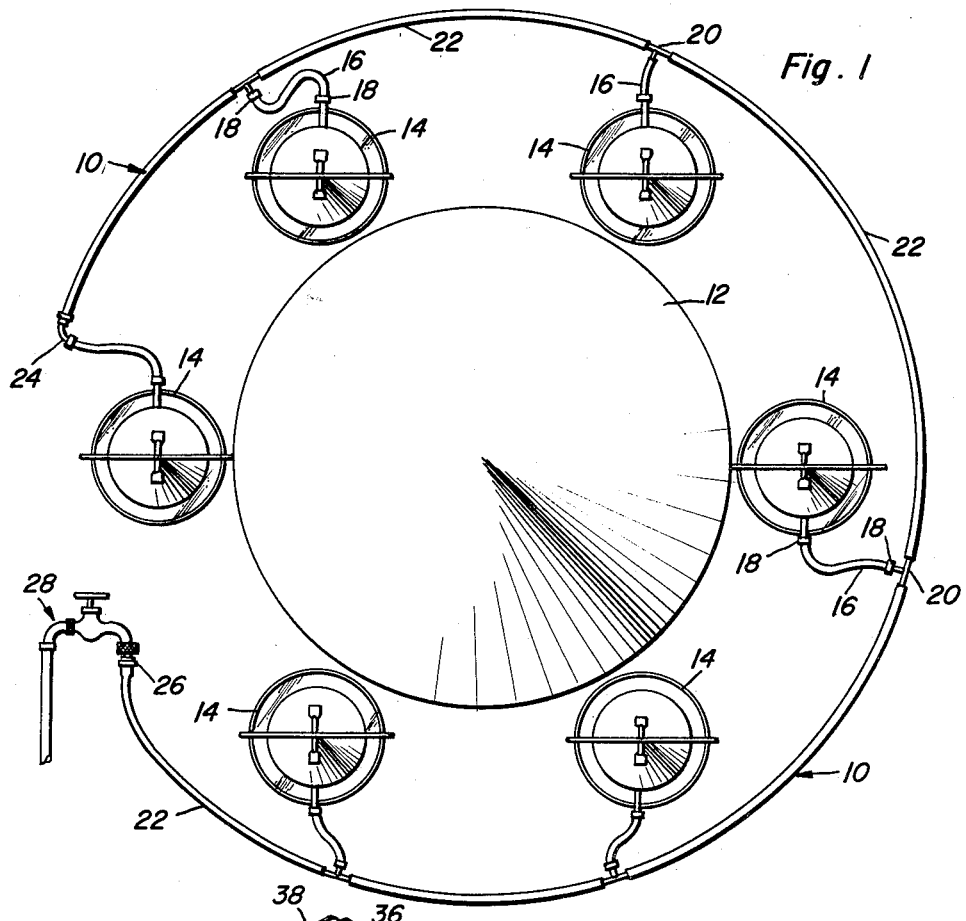
FIGURE 1 is a top plan view of the automatic watering system arranged so as to surround a brooder. This figure also shows, in elevation, the manner in which the system is connected to a standard water faucet.

Referring now more particularly to the drawings, reference numeral 10 generally designates the automatic watering system comprising the present invention. Such a system is shown in FIGURE 1 arranged so as to surround a brooder 12 with the individual waterers 14 positioned adjacent the brooder 12. This arrangement of the watering system is especially desirable for winter brooding, however, the present invention is obviously not limited to such an arrangement.

As shown in FIGURE 1, a hollow flexible hose 16 is secured to each individual waterer 14, each hose being provided at the ends thereof with standard ferrule type fittings 18. The end of each hose 16 opposite from the waterer being secured to a standard T-shaped connection 20. Second flexible hose means 22 are secured between the T-shaped fittings 20 thus providing a plurality of individual waterers secured together by a plurality of flexible hoses 16 and 22 and hose connections 18 and 20. The last individual poultry waterer obviously does not require the use of a T-shaped fitting, and is secured either directly to the second hose means or indirectly by means of an angular hose fitting 24. The first section of the above mentioned second hose means 22 has its free end 26 secured to a standard water faucet and water pipe 28 by means of a standard ferrule type connection.

Figure 2:
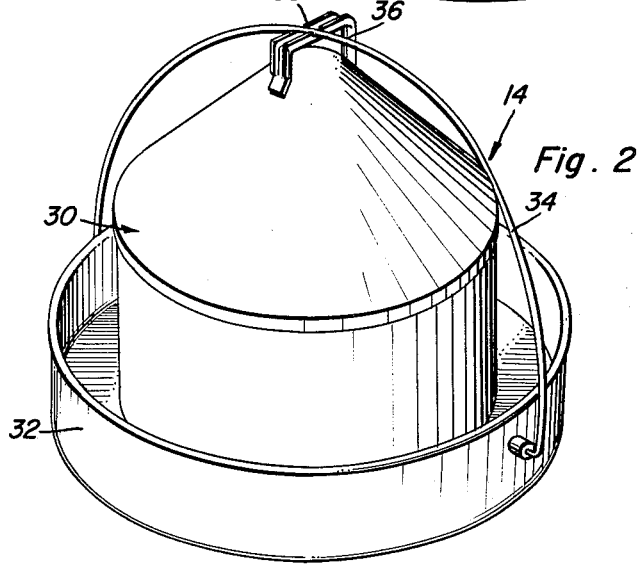
FIGURE 2 is a perspective view of one of the individual poultry waters and particularly shows the manner in which the pan handle and cover handle are interlocked.

With reference to FIGURES 2 and 7 it will be noted that each individual waterer consists essentially of a cover member 30 and a pan member 32, the members being interconnected in operative relationship by means of interlocking handle means comprising a wire-type handle 34 secured in any standard manner to opposite sides of the pan member 32, and a U-shaped handle means 36 secured to the top of the cover member 30, said U-shaped handle means 36 having notches 38 therein. The handle means 34 and 36 being such that they may be interlocked by a slight flexing of the handle 34 so as to resiliently locate the uppermost portion of said handle 34 within the notches 38 of handle 36.

The cover member 30 consists of a top portion 40 and a side portion 42. The portions are preferably welded or soldered together so as to provide a unitary member, also, said cover member could obviously be formed in one piece. If desired, for purposes of maintaining easy access to the interior of the waterer during the operation thereof, the cover member can be retained in two sections. The side portion 42 of the cover member 30 is provided with a plurality of apertures 44 spaced approximately 120° apart on the circumference of said side section.

Each pan member 32 is provided with a raised ridge or ring 46 located in the bottom thereof, the ring 46 having an external circumferential dimension slightly less than the circumference of the interior of the cover member 30 thus providing a simple and unique manner for centering the cover in the pan. The apertures 44 are located above the base of the side portion 42 of cover 30 so as to be above ridge 46 thus allowing free flow of water into the pan.

Turning now to the specific manner in which the water level is automatically maintained in the individual waterer, attention is specifically directed to FIGURES 3–6 wherein the reference numeral 48 designates a float consisting of any suitable buoyant material. The float 48 is pivotally secured to a horizontally extending float arm 50 by means of a U-shaped member 52 having the leg portions thereof extending through the float member and secured to the bottom side thereof with washers 54 located at both the top and bottom of said float 48 so as to prevent any unnecessary wear on the body of said float member 48 by member 52. The bight portion of the U-shaped member 52 is freely supported within an opening 56 in the float arm 50, thus allowing the float 48 to remain horizontally oriented at all times.

The opposite end of the float arm 50 has pivotally secured thereto a vertically extending lever means 58. The central portion of the lever means 58 is pivotally secured between two extending arms 60 of a channel-shaped member 62 secured to the side section 42 of the cover member 30 by bolts 63. The arms 60 consist of inward extensions on the upper portions of the sides 64 of the channel-shaped member 62. Said arms 60 extend inwardly from the side section 42 of the cover member 30 and converge toward each other for a portion of the length of said arms and then extend parallel to each other to their ends.

The upper end of the lever means 58 is pivotally secured to an adjusting rod 66 which extends through the side portion 42 of the cover member 30. Said adjusting rod 66 extends through aligned apertures 68 in the cover and channel-shaped member 62, and is secured thereto by means of an adjusting nut 70 which is operative from the exterior of the cover member 30.

A standard automatic valve 72 is secured to the cover member 30 through aligned apertures in the cover member and the channel-shaped member by means of a nut 74. The valve 72 is provided with a plunger-type valve actuator 76 extending from the inner end of valve 72 and in alignment with the end of the float arm 50 which end of the float arm is adapted to contact the plunger 76 and thus actuate the valve mechanism 72 when the float 48 is in a lowered position. When the valve mechanism 72 is actuated by the action of the float arm 50 on the plunger 76 the level of the water 78 within the waterer is raised, thus raising the float 48 and disengaging the float arm 50 from the plunger 76. By this means, the level of the water 78 within the waterer 14 is maintained at a constant height. This constant height can be varied by positioning the float arm 50 either closer to or further away from the plunger 76 by means of the adjusting rod 66 and the adjusting nut 70.

The outer end of the valve mechanism 72 is secured to the hose means 16 by a standard hose coupling 18.

Figure 3:
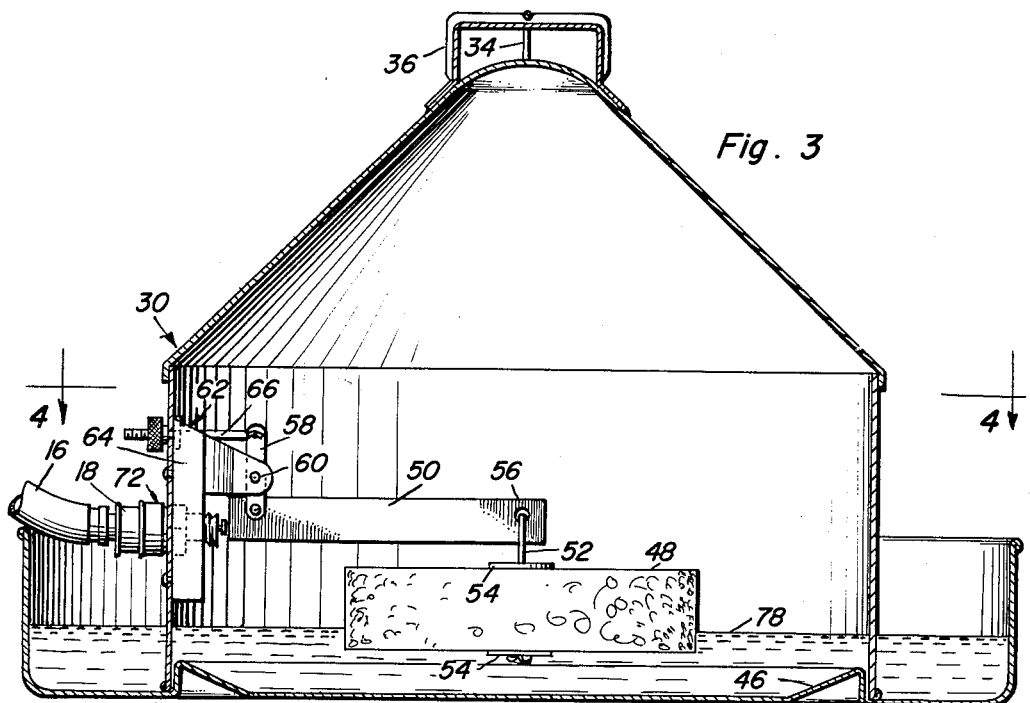
FIGURE 3 is a section through one of the individual poultry waterers illustrating the manner in which the various parts are orientated.
Figure 4:
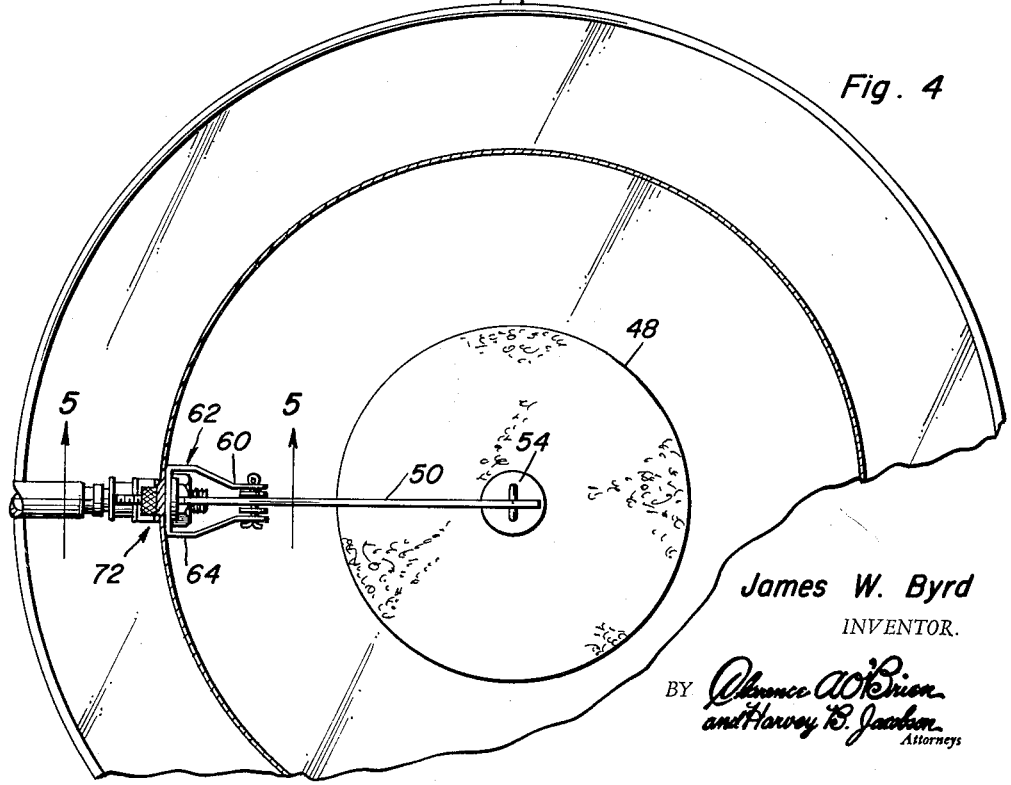
FIGURE 4 is a partial sectional view taken substantially on line 4—4 of FIGURE 3.

As is more clearly shown in FIGURE 3, the valve mechanism is secured to the cover member above the water level thus eliminating the necessity of providing an elaborate sealing means.

In the event that servicing or cleaning of the waterer is necessary, the cover member 30 can be lifted out of the pan member 32 and inverted thereby permitting the float arm 50 to pivot away from the plunger 76 thus cutting off the flow of water and permitting easy access to the valve mechanism, float means and the interior of both the cover member and pan member.

From the foregoing, it is apparent that a novel automatic watering system has been defined. This system, which can readily be arranged in a variety of desired positions, comprises a plurality of individual waterers, each being capable of accommodating approximately one hundred and fifty chicks. The waterers each containing a float and valve mechanism enabling the water level therein to be maintained at a constant height. The level of the water, upon decreasing will cause the float to move downwardly along with its associated end of the float arm causing the other end of the float arm to pivot about the pivotal connection between the float arm and the lever and thus contacting the plunger which in turn actuates the valve mechanism causing the water to flow into the waterer and thus raising the water level and float and consequently disengaging and releasing the plunger. FIGURE 6 is of particular interest in this respect for the showing of the manner in which the end of the float arm engages the plunger. Further, of particular importance is the use of the novel raised ridge to center the cover member within the pan, and the unique manner of interconnecting the handle means for easy transportation of the assembled waterer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic poultry waterer comprising a pan having a peripheral upstanding wall so as to be capable of retaining water therein, a cover member freely resting on the bottom of said pan and completely enclosing a central portion thereof spaced inwardly from the peripheral wall of said pan, a plurality of holes around the lower end of said cover member, valve means secured to and extending through said cover member with a first end extending interiorly of the cover member and the other end extending exteriorly of the cover member, an actuating plunger on the first end of said valve means extending into the interior of said cover member, a pressurized water supply a supply hose engaged between said water supply and the other end of said valve means extending exteriorly of said cover member, a float means centrally located within said cover member, an elongated arm member pivotally secured at one end to the float means and at the other end to the cover member juxtaposed to the plunger, said other end of the arm contacting and actuating said plunger when the float is in a lowered position thus allowing a flow of water through said valve, and out of contact with said plunger when the float is in a raised position, thereby maintaining a constant water level in said pan, said other end of the arm being secured to the cover member by means of a substantially U-shaped bracket having the bight portion thereof secured to the cover member, a lever means pivotally secured substantially at its mid-point between the extending legs of the U-shaped bracket, the lower end of said lever means being pivotally secured to the arm member, the upper end of said lever means being pivotally secured to a threaded adjusting rod, said rod extending through the cover member to the exterior thereof and being adjustably secured thereto by an exteriorly operable adjusting nut, said nut being in threaded engagement with the rod and in bearing contact with the outside of the cover for varying the distance between said other end of the arm and the plunger, thereby providing means for varying the water level in the pan without removing the cover member at any time during the operation of the device.

2. An automatic poultry waterer comprising a pan having a peripheral upstanding wall so as to be capable of retaining water therein, a cover member freely resting on the bottom of said pan and completely enclosing a central portion thereof spaced inwardly from the peripheral wall of said pan, a plurality of holes around the lower end of said cover member, valve means secured to and extending through said cover member with a first end extending interiorly of the cover member and the other end extending exteriorly of the cover member, an actuating plunger on the first end of said valve means extending into the interior of said cover member, a pressurized water supply, a supply hose engaged between said water supply and the other end of said valve means extending exteriorly of said cover member, a float means centrally located within said cover member, an elongated arm member pivotally secured at one end to the float means and at the other end to the cover member juxtaposed to the plunger, said other end of the arm contacting and actuating said plunger when the float is in a lowered position thus allowing a flow of water through said valve, and out of contact with said plunger when the float is in a raised position, thereby maintaining a constant water level in said pan, said other end of the arm being secured to the cover member by bracket means extending inwardly of the cover member, a vertically extending lever means pivotally secured substantially at its mid-point to the inner end of the bracket means, the lower end of said lever means being pivotally secured to the arm member, the upper end of the lever means being pivotally secured to a threaded adjusting rod, said rod extending through the cover member to the exterior thereof and being adjustably secured thereto by an exteriorly operable adjusting nut, said nut being in threaded engagement with the rod and in bearing contact with the outside of the cover for varying the distance between said other end of the arm and the plunger upon a rotation of the nut, thereby providing means for varying the water level in the pan without removing the cover member at any time during the operation of the device.

3. The structure of claim 2 wherein said adjusting nut includes peripheral slot means captively engaging that portion of the cover member surrounding the rod in a manner so as to allow only rotational movement of the nut.

References Cited in the file of this patent
UNITED STATES PATENTS

| | | |
|---|---|---|
| 478,397 | Brown | July 5, 1892 |
| 1,851,682 | Oakes | Mar. 29, 1932 |
| 1,918,128 | Pfening et al. | July 11, 1933 |
| 1,928,103 | Hill | Sept. 26, 1933 |
| 2,460,049 | Weiby | Jan. 25, 1949 |
| 2,492,806 | Levine | Dec. 27, 1949 |
| 2,571,206 | Couture | Oct. 16, 1951 |